United States Patent
Fernández et al.

(10) Patent No.: US 7,187,991 B2
(45) Date of Patent: Mar. 6, 2007

(54) FAILSAFE CONTROL CIRCUIT FOR ELECTRICAL APPLIANCES

(75) Inventors: Gonzalo Fernández, Elorrio (ES); Eider Landa, Bergara (ES); José Miguel Amoriza, Galdakao (ES); Eneko Muguerza, Iurreta (ES)

(73) Assignee: Fagor, S. Coop., Mondragon (ES)

( * ) Notice: Subject to any disclaimer, the term of this patent is extended or adjusted under 35 U.S.C. 154(b) by 206 days.

(21) Appl. No.: 10/900,679

(22) Filed: Jul. 27, 2004

(65) Prior Publication Data
US 2005/0027375 A1 Feb. 3, 2005

(30) Foreign Application Priority Data
Jul. 31, 2003 (ES) ................. 200301821

(51) Int. Cl.
G05B 9/02 (2006.01)
H03K 19/007 (2006.01)
(52) U.S. Cl. .............. 700/79; 714/24; 326/14
(58) Field of Classification Search .......... 700/79, 700/21; 714/699, 709, 24; 326/14; 701/39, 701/62, 76, 97, 107
See application file for complete search history.

(56) References Cited

U.S. PATENT DOCUMENTS

| | | | | | |
|---|---|---|---|---|---|
| 4,410,329 | A | * | 10/1983 | Blevins et al. ............... 8/158 |
| 4,488,303 | A | * | 12/1984 | Abramovich ............... 714/24 |
| 4,594,681 | A | * | 6/1986 | Eue et al. ................... 714/24 |
| 4,628,443 | A | * | 12/1986 | Rickard et al. ............. 700/79 |
| 4,631,722 | A | * | 12/1986 | Voss .......................... 714/24 |
| 4,726,024 | A | * | 2/1988 | Guziak et al. .............. 714/24 |
| 4,745,542 | A | * | 5/1988 | Baba et al. ................. 700/79 |
| 4,812,677 | A | * | 3/1989 | Perry ......................... 326/14 |
| 4,816,647 | A | * | 3/1989 | Payne .................... 219/448.12 |
| 5,068,853 | A | * | 11/1991 | Soma et al. ................ 714/24 |
| 5,195,098 | A | * | 3/1993 | Johnson et al. ............ 714/753 |
| 5,420,397 | A | * | 5/1995 | Weiss et al. ............... 219/501 |
| 5,586,124 | A | * | 12/1996 | Nicolaidis ................. 714/736 |
| 5,790,419 | A | * | 8/1998 | Matsuda et al. ........... 700/79 |
| 6,038,671 | A | * | 3/2000 | Tran et al. ................. 713/300 |
| 6,433,926 | B2 | * | 8/2002 | Pedersen et al. ........ 359/341.43 |
| 6,647,301 | B1 | * | 11/2003 | Sederlund et al. ......... 700/79 |

* cited by examiner

*Primary Examiner*—Thomas Pham
(74) *Attorney, Agent, or Firm*—The Kline Law Firm (57) ABSTRACT

Failsafe control circuit for electrical appliances whereby at least one electrical load (10) is activated, the control circuit comprising logic control means (1), operation switching means (8) between said electrical load (10) and a supply voltage (V), and a first drive circuit (6) which receives a first command signal (4) from the logic control means (1), said first drive circuit (6) acting on said operation switching means (8). It also comprises security switching means (9) between the electrical load (10) and the supply voltage (V), and a second drive circuit (7) which receives a second command signal (5) from the logic control means (1), said second drive circuit (7) acting on the security switching means (9) so that it closes said security switching means (9) only if said second command signal (5) is a pulse signal.

14 Claims, 7 Drawing Sheets

FAILSAFE CONTROL CIRCUIT FOR ELECTRICAL APPLIANCES

BACKGROUND OF THE INVENTION

The present invention relates to control circuits for activating electrical loads of electrical appliances.

Control systems for the activation of electrical loads in electrical appliances are known which comprise an electronic circuit that includes logic control means such as a microprocessor. It is important to guarantee that this type of control systems are safe against failures of the electronic circuit itself, and particularly against failures of the logic control means.

U.S. Pat. No. 5,175,413 discloses a failsafe control system for operating a power relay to energize a resistive heating element in a cooking apparatus. The control system comprises a logic circuit, such as a microprocessor, with an output connected to a first branch which acts on a first transistor and a second branch which acts on a second transistor. The first and second transistors are both in series, and are also in series with the power relay. The first branch, which comprises an operational amplifier, only acts on the first transistor if it receives pulses from the microprocessor output, so that the power relay is not energized if the microprocessor fails. The second branch, which also comprises an operational amplifier, acts on the second transistor in accordance with the user's instructions.

The main drawback of the control system disclosed is that it is not failsafe against the sticking of the power relay contacts which control the load, as said sticking would make said load be switched on uninterruptedly.

Furthermore, in said control system it is necessary to use high-capacity transistors against the second break, as if a failure occurred in the free-wheeling diode of the power relay, said diode remaining in open circuit, the overvoltage that would occur in said transistors on interrupting the current of the power relay coil would be very high. If an avalanche occurred in said transistors due to the overvoltage generated by the power relay coil, the transistors would short-circuit, meaning that, with a single failure, the power relay contacts would be closed.

Furthermore, it is necessary that the two operational amplifiers are not integrated in the same integrated circuit since, for example, with a single failure such as the ground disconnection of said integrated circuit, both outputs would be simultaneously at a high level, causing current to flow through the power relay coil, the load being energized uninterruptedly.

BRIEF SUMMARY OF THE INVENTION

The main object of the invention is to provide a failsafe control circuit for electrical appliances. A second object of the invention is to provide a failsafe circuit of high simplicity and reliability and low cost.

The control circuit of the invention, whereby at least one electrical load is activated, comprises logic control means, operation switching means between said electrical load and a supply voltage, and a first drive circuit which receives a first command signal from the logic control means, said first drive circuit acting on said operation switching means.

It also comprises security switching means between the electrical load and the supply voltage, and a second drive circuit which receives a second command signal from the logic control means, said second drive circuit acting on the security switching means so that it only switches on said security switching means if said second command signal is a pulse signal.

The main advantage of the control circuit of the invention is that it is safe in the event of failure of any of its components, including the failure of the logic control means and the failure of the operation switching means or the security switching means. This implies that, if any of said components fail, there is no risk that the electrical load is energized uninterruptedly, thus providing safety to the users.

Furthermore, another important advantage of the control circuit of the invention is its high simplicity and, as a consequence of this, its reliability, as the number of potential failures to be considered is reduced. For this, simple circuits are used wherein elements such as operational amplifiers are dispensed with. Evidently, the simplicity of the control circuit also has the consequence of the reduction in the cost thereof.

These and other objects, advantages and characteristics of the invention will be made evident in the light of the drawings and the detailed description thereof.

DETAILED DESCRIPTION OF THE INVENTION

Figure 1:
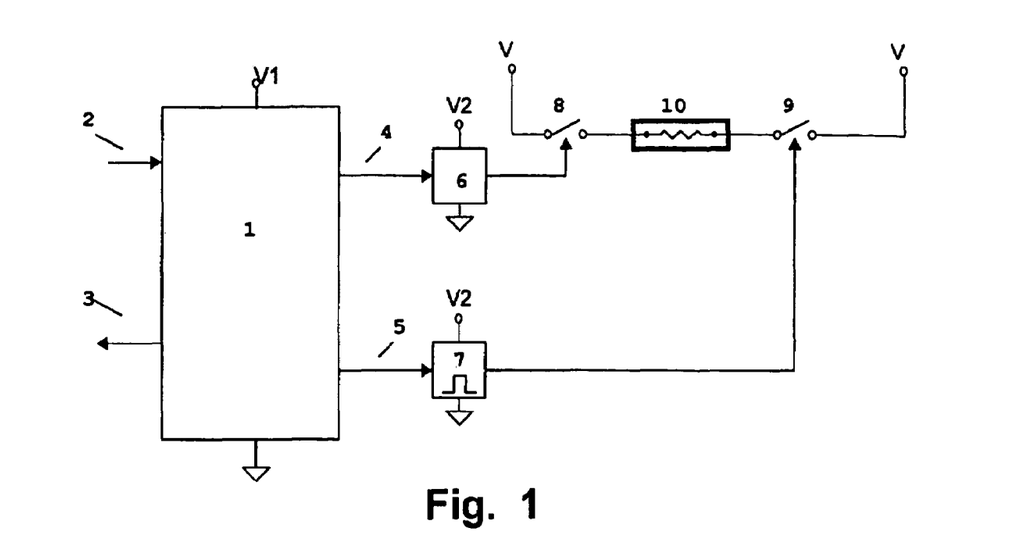
FIG. 1 represents a general diagram of the basic configuration of the invention.

With reference to FIG. 1, the control circuit of the invention comprises, for the case of a single electrical load 10, logic control means 1, operation switching means 8 between said electrical load 10 and a supply voltage V, and a first drive circuit 6 which receives a first command signal 4 from the logic control means 1, said first drive circuit 6 acting on said operation switching means 8.

It also comprises security switching means 9 between the electrical load 10 and the supply voltage V, and a second drive circuit 7 which receives a second command signal 5 from the logic control means 1, said second drive circuit 7 acting on the security switching means 9 in accordance with said second command signal 5.

The second drive circuit 7 only closes the security switching means 9 if the second command signal 5 is a pulse signal. Thus, it is assured that the electrical load 10 is not energized when the logic control means 1 fail, because the second drive circuit 7 would stop receiving the expected pulse signals from the logic control means 1.

The logic control means 1 comprise, in the preferred embodiment, a microprocessor. Said microprocessor receives the instruction signals 2 from the user and, in accordance with said instruction signals 2, generates the status signals 3 and also the command signals 4 and 5. The circuit of the invention, in addition to being safe against the failure of the microprocessor and the switching means 8 or 9, is also safe against the failure of the output terminal of the microprocessor which generates the command signal 4 and against the failure of the output terminal of said microprocessor which generates the command signal 5.

Figure 2:
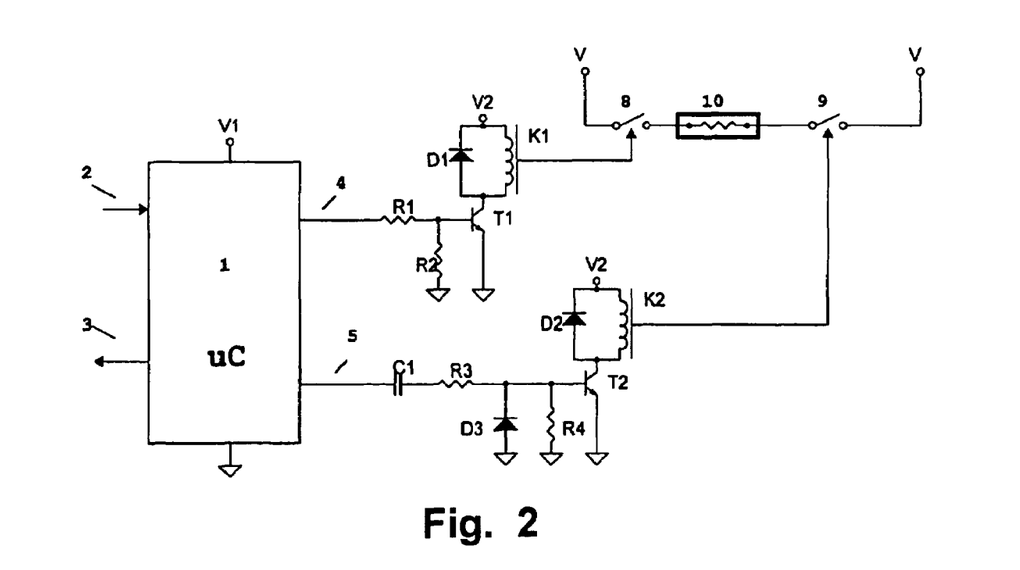
FIG. 2 shows a detailed diagram of a first embodiment of the configuration of FIG. 1.

In the embodiment of FIG. 2, the security switching means 9 comprise a power relay with a coil K2, and the drive circuit 7 comprises a monostable circuit which acts on said coil K2. Said monostable circuit only permits a current to flow through the coil K2 of the security switching means 9 if the second command signal 5 is a pulse signal at a frequency higher than a pre-established minimum frequency.

The monostable circuit comprises a bipolar transistor T2 connected in series with the coil K2 and a capacitor C1 which filters the second command signal 5 before it reaches said bipolar transistor T2. Said monostable circuit is completed with the resistors R3 and R4 and the diode D3. The coil K2 is connected in parallel to a free-wheeling diode D2.

Figure 5:
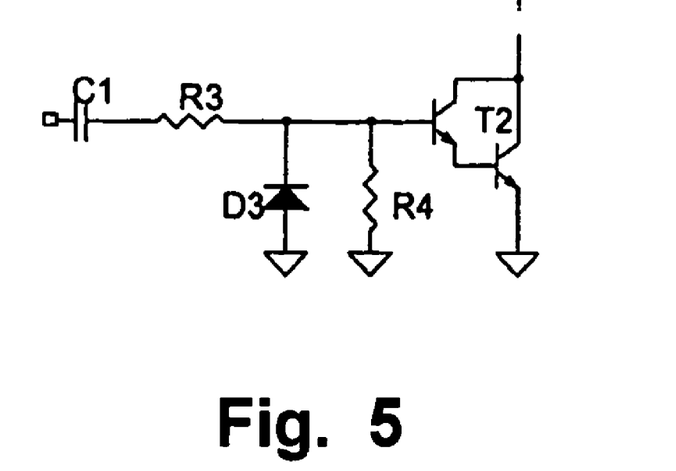
FIG. 5 shows a second embodiment of the drive circuit of the security switching means of FIG. 2.

In a second embodiment of the monostable circuit, the bipolar transistor T2 is replaced, as is shown in FIG. 5, by two bipolar transistors in Darlington configuration. This embodiment will be appropriate in those cases in which the rated current of the coil K2 is a high value since, as at least one of the two transistors functions in the linear zone, the necessary base current is drastically reduced.

Figure 6:
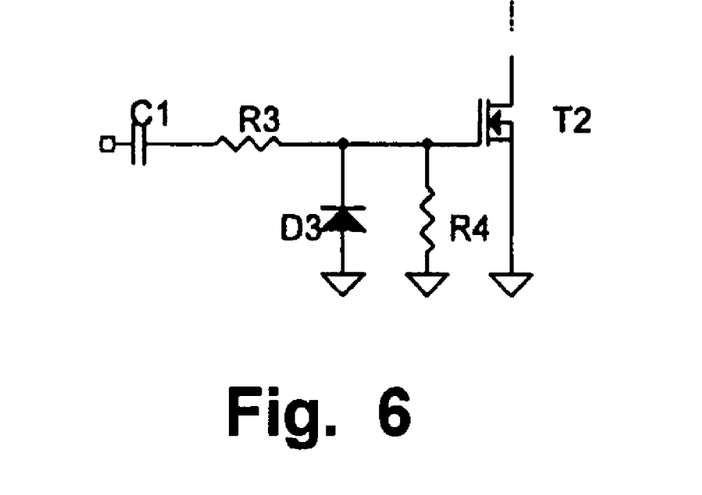
FIG. 6 shows a third embodiment of the drive circuit of the security switching means of FIG. 2.

In a third embodiment of the monostable circuit, the bipolar transistor T2 is replaced, as is shown in FIG. 6, by a FET transistor. In this way, as the necessary gate current is practically inappreciable, the current requirements on the microprocessor and the value of the capacity of the capacitor C1 are considerably reduced.

As is shown in FIG. 2, the operation switching means 8 comprise a power relay with a coil K1, and the drive circuit 6 comprises a transistor T1 connected in series with said coil K1. Said drive circuit 6 is completed with the resistors R1 and R2. The coil K1 is connected in parallel to a free-wheeling diode D1.

Figure 3:
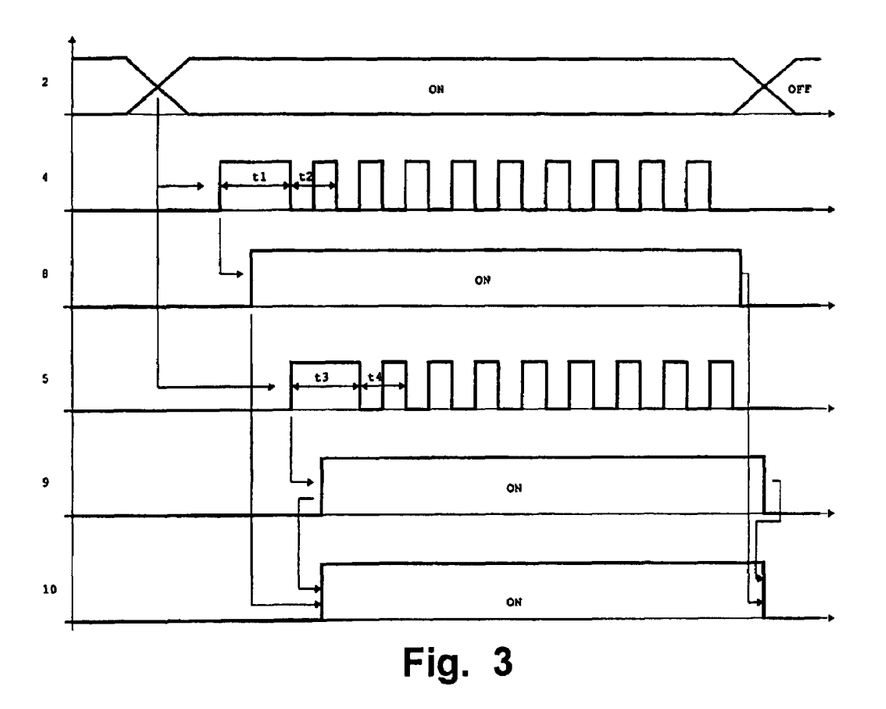
FIG. 3 represents the main signals involved in the embodiment of FIG. 2.

In a preferred embodiment, the first command signal 4 is also a pulse signal. With reference to FIG. 3, when the microprocessor receives an instruction signal 2 which involves the activation of the electrical load 10, the microprocessor generates the command signals 4 and 5. As is shown in said FIG. 3, in this embodiment both command signals 4 and 5 are pulse signals which have two parts: an initial framing pulse, t1 and t3 respectively, and a maintenance pulse signal with a cycle t2 and t4 respectively.

The duration of the initial pulses t1 and t3 is such that it assures that the contacts of the two power relays are closed. Once the inertias of said power relays are exceeded so that they close their respective contacts, the energy supplied to the coils K1 and K2 can be reduced provided that said contacts are kept closed. FIG. 3 represents a 50% reduction of the rated value, but lower values are possible, which means that the power supply V2 consumption would be reduced even further.

As is observed in FIG. 3, there is a phase difference between the first command signal 4 and the second command signal 5. Said phase difference reduces the overlap between both command signals 4 and 5, so that the overlap in the energy supplied to the coils K1 and K2 of the power relays is also reduced, thus reducing the average current that the power supply V2 should be capable of providing. In FIG. 3 said overlap has been reduced to the minimum meaning that there is a phase difference of a semi-cycle between the command signals 4 and 5.

Figure 4:
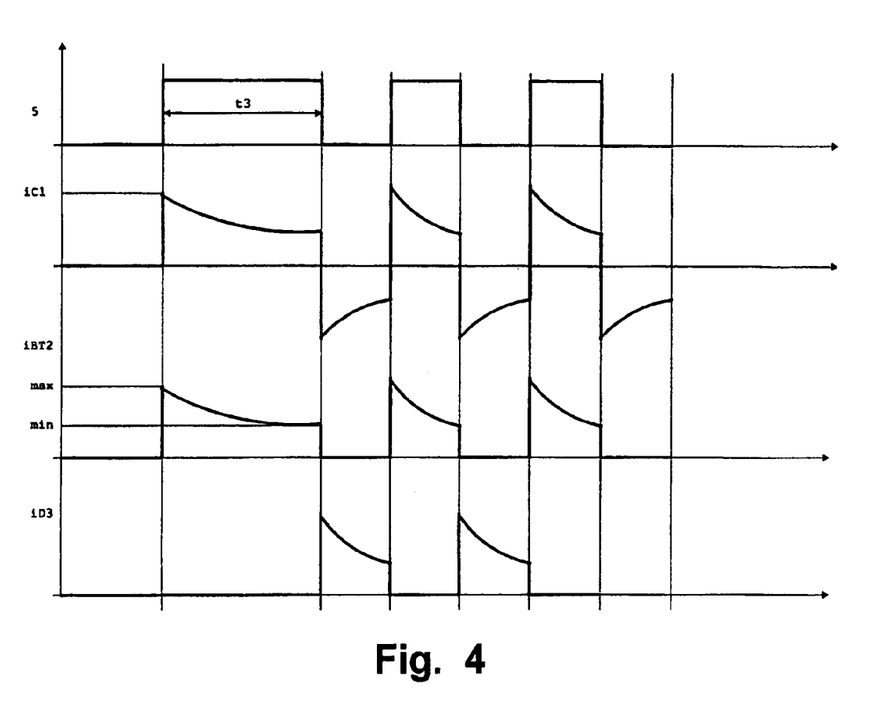
FIG. 4 represents the signals relating to the drive circuit of the security switching means of FIG. 2.

FIG. 4 shows the signals related to the operation of the drive circuit 7, iC1 being the current in the capacitor C1, iBT2 being the base current of the transistor T2, and iD3 being the current that flows through the diode D3.

In an alternative embodiment, the operation switching means 8 comprise, instead of a power relay, a triac. In this way, a cheaper solution for lower power electrical loads 10 is achieved and a finer control solution of the power to be supplied to the electrical load 10 in a variable form is achieved, said control being for example a phase control, a pulse train control, etc. Furthermore, it is also possible to make the security switching means 9 comprise a triac instead of a power relay. Finally, another possible embodiment is that wherein both the operation switching means 8 and the security switching means 9 comprise a triac.

Figure 7:
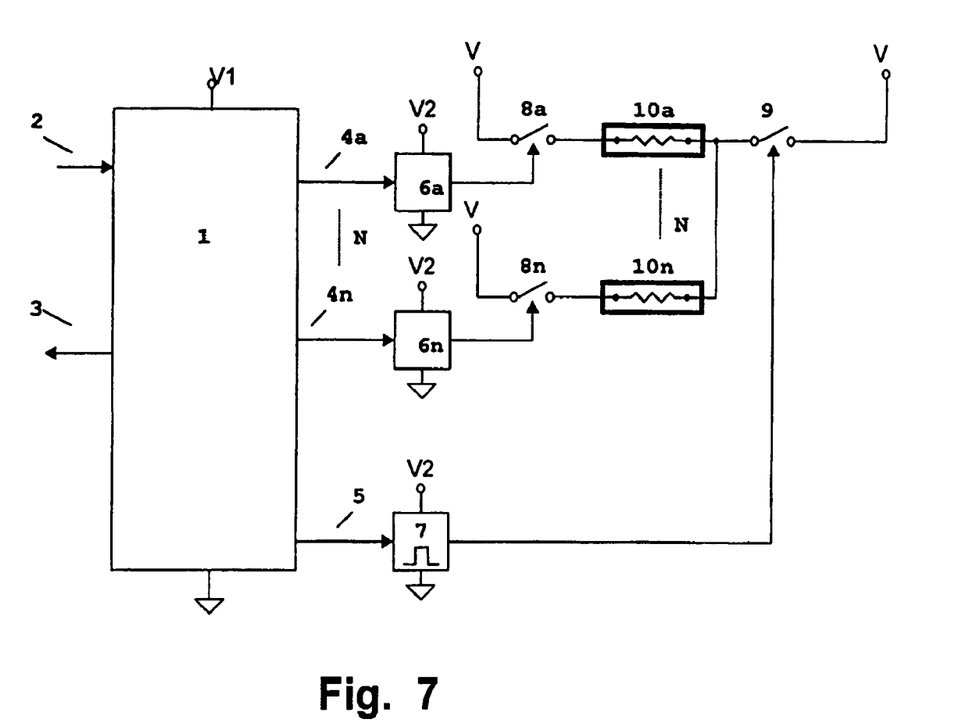
FIG. 7 represents a general diagram of the basic configuration of FIG. 1 for the case of a plurality of electrical loads with security switching means common to all of them.
Figure 8:
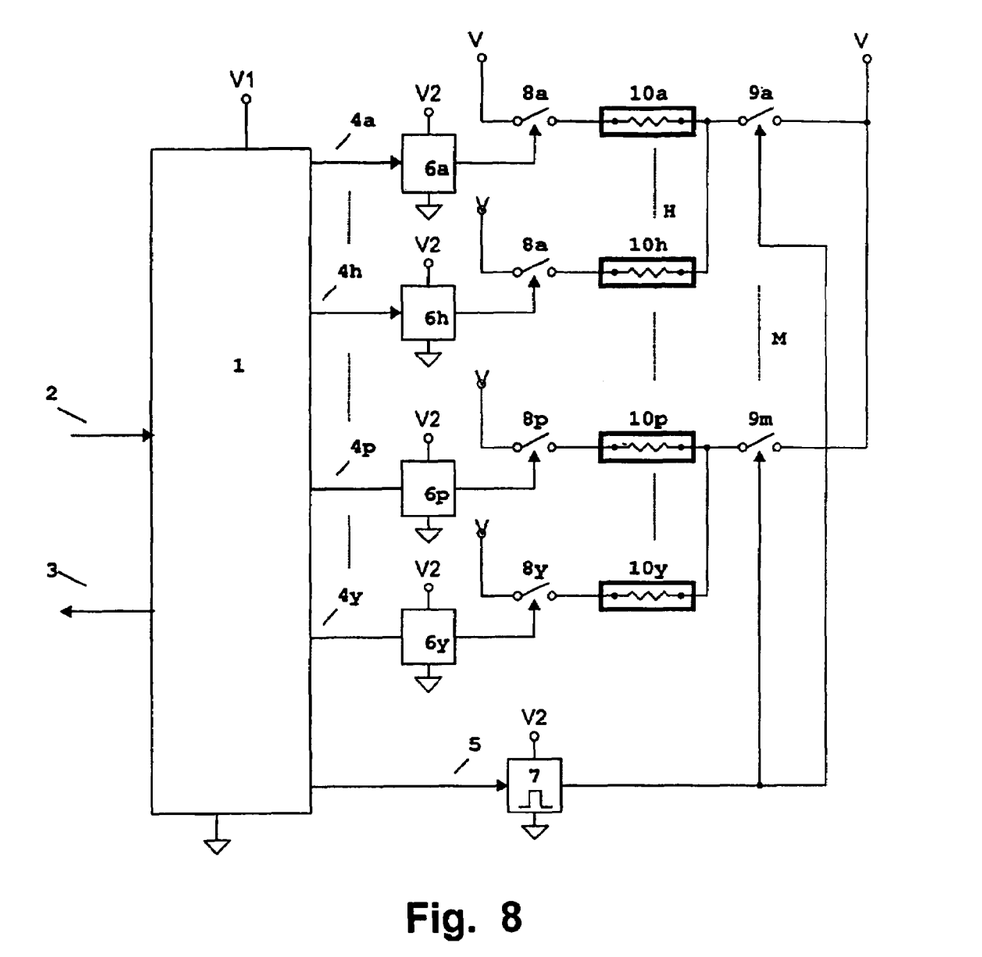
FIG. 8 represents a general diagram of the basic configuration of FIG. 1 for the case of a plurality of electrical loads with independent security switching means for each one of them.

For the most usual case, in which there is a plurality of electrical loads 10a, . . . 10n instead of a single electrical load 10, the embodiment disclosed is generalized for said plurality of electrical loads 10a, . . . 10n as is shown in FIG. 7. For this case, command signals 4a, . . . 4n, drive circuits 6a, . . . 6n, and operation switching means 8a, . . . 8n, and security switching means 9 are used. If the power of the plurality of electrical loads 10a, . . . 10n is such that the maximum current of the security switching means 9 is exceeded, the circuit of the invention is configured so that a plurality of security switching means 9a, . . . 9m are used, as is shown in FIG. 8. Therefore, for example, switching means 9a are connected to the electrical loads 10a, . . . 10h, and switching means 9m are connected to the electrical loads 10p, . . . 10y.

Figure 9:
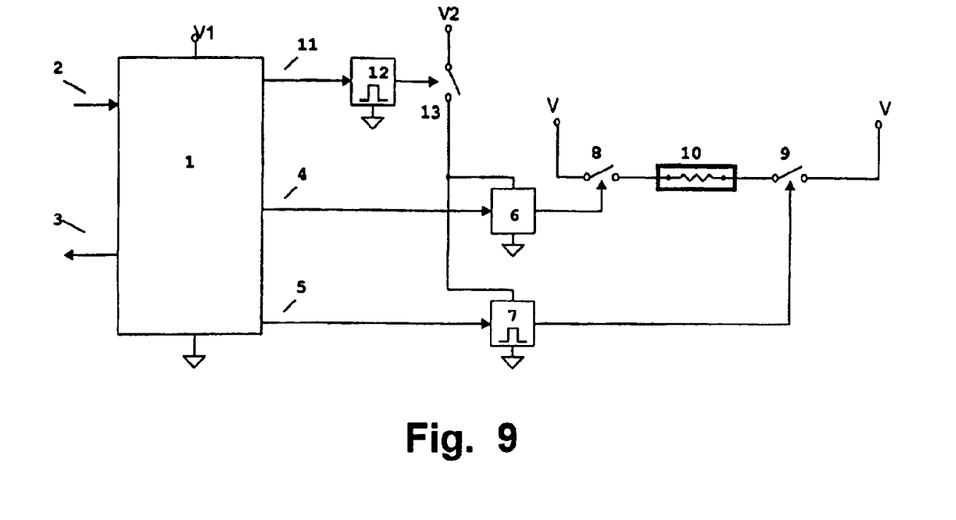
FIG. 9 represents a general diagram of a second configuration of the invention based on the basic configuration of FIG. 1.

Starting from the basic configuration of the invention already described, FIG. 9 shows a second configuration of the invention wherein the control circuit also comprises security switching means 13 between the first and second drive circuits 6 and 7 and their supply voltage V2, and comprises a third drive circuit 12 which receives a third command signal 11. Said drive circuit 12 closes said security switching means 13 only if the third command signal 11 is a pulse signal.

This second configuration is safe against the simultaneous failure of the operation switching means 8 or the security switching means 9 and any of the other components of the control circuit, as well as against the simultaneous failure of two of said components of the control circuit.

Figure 10:
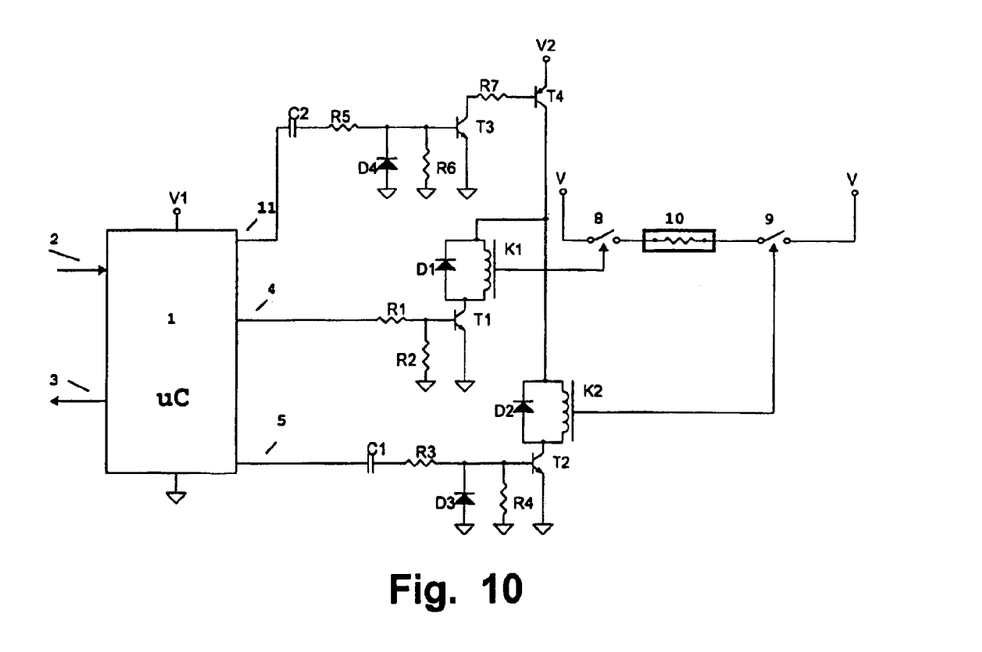
FIG. 10 shows a detailed diagram of an embodiment of the configuration of FIG. 9.

In a preferred embodiment of this second configuration, the drive circuit 12 comprises a monostable circuit which has two transistors T3 and T4, a capacitor C2, resistors R5, R6 and R7, and a diode D4.

In a preferred embodiment of the invention, a maximum operating time is set after which the electrical load 10 stops being energized. This increases the safety of the control circuit of the invention, protecting it, for example, in a situation in which the user has forgotten to deactivate the electrical load. Therefore, once said maximum operating time has passed, the logic control means 1 will make both the operation switching means 8 and the security switching means 9 open.

Preferably, the maximum operating time is determined in accordance with the power being supplied to the electrical load 10, said maximum operating time being lower the higher said power is.

The invention claimed is:

1. A failsafe control circuit for electrical appliances whereby at least one electrical load (10) is activated, the control circuit comprising logic control means (1), operation switching means (8) between said electrical load (10) and a supply voltage (V), and a first drive circuit (6) which receives a first command signal (4) from the logic control means (1), said first drive circuit (6) acting on said operation switching means (8), security switching means (9) between the electrical load (10) and the supply voltage (V), and a second drive circuit (7) which receives a second command signal (5) from the logic control means (1), said second drive circuit (7) acting on the security switching means (9) so that it closes said security switching means (9) only if said second command signal (5) is a pulse signal.

2. The failsafe control circuit according to claim 1, wherein the security switching means (9) comprise a power relay with a coil (K2), and the drive circuit (7) comprises a monostable circuit which acts on said coil (K2), so that it only permits a current to flow through the coil (K2) of the security switching means (9) if the second command signal (5) is a pulse signal at a frequency higher than a pre-established minimum frequency.

3. The failsafe control circuit according to claim 1, wherein at least one of the switching means (8,9) comprises a triac.

4. The failsafe control circuit according to claim 1, wherein it also comprises security switching means (13) between the first and second drive circuits (6,7) and its supply voltage (V2), and comprises a third drive circuit (12) which receives a third command signal (11), so that said drive circuit (12) closes said security switching means (13) only if the third command signal (11) is a pulse signal.

5. The failsafe control circuit according to claim 1, wherein a maximum operating time is set, after which the electrical load (10) is no longer energized.

6. The failsafe control circuit according to claim 2, wherein the monostable circuit comprises a transistor connected in series with the coil (K2) and a capacitor (C1) which filters the second command signal (5) before it reaches said transistor.

7. The failsafe control circuit according to claim 2, wherein the operation switching means (8) comprise a power relay with a coil (K1), and the drive circuit (6) comprises a transistor (T1) connected in series with said coil (K1).

8. The failsafe control circuit according to claim 5, wherein the maximum operating time is determined in accordance with the power that is being supplied to the electrical load (10).

9. The failsafe control circuit according to claim 7, wherein the first command signal (4) is also a pulse signal.

10. The failsafe control circuit according to any of claims 1, 2 or 6, wherein the operation switching means (8) comprise a triac.

11. The failsafe control circuit according to claim 6, wherein the operation switching means (8) comprise a power relay with a coil (K1), and the drive circuit (6) comprises a transistor (T1) connected in series with said coil (K1).

12. The failsafe control circuit according to claim 9, wherein there is a phase difference between the first command signal (4) and the second command signal (5), so that the overlap of energy which has to be supplied to coil (K1) and coil (K2) is reduced.

13. The failsafe control circuit according to claim 11, wherein the first command signal (4) is also a pulse signal.

14. The failsafe control circuit according to claim 13, wherein there is a phase difference between the first command signal (4) and the second command signal (5), so that the overlap of energy which has to be supplied to coil (K1) and coil (K2) is reduced.

* * * * *